US006361035B1

(12) United States Patent
Collins

(10) Patent No.: US 6,361,035 B1
(45) Date of Patent: Mar. 26, 2002

(54) VISE PLATES WITH CHAIN BLOCKS

(76) Inventor: Truman Collins, 600 Ellingson Rd. #S-7, Pacific, WA (US) 98047

( * ) Notice: Subject to any disclaimer, the term of this patent is extended or adjusted under 35 U.S.C. 154(b) by 0 days.

(21) Appl. No.: 09/467,795

(22) Filed: Dec. 20, 1999

(51) Int. Cl.[7] .................................................. B25B 1/20
(52) U.S. Cl. .............................. 269/45; 269/43; 269/88; 269/900; 269/902; 269/152
(58) Field of Search ........................... 269/88, 43, 900, 269/902, 152, 154, 45

(56) References Cited

U.S. PATENT DOCUMENTS

| | | | | |
|---|---|---|---|---|
| 4,045,010 A | * | 8/1977 | Arnold | 269/315 |
| 4,186,916 A | * | 2/1980 | Varga | 269/303 |
| 4,445,678 A | * | 5/1984 | George | 269/88 |
| 5,026,033 A | * | 6/1991 | Roxy | 269/71 |
| 5,330,167 A | * | 7/1994 | Plumb | 269/43 |
| 5,732,455 A | * | 3/1998 | Diede | 269/45 |

* cited by examiner

Primary Examiner—Joseph J. Hail, III
Assistant Examiner—Lee Wilson
(74) Attorney, Agent, or Firm—David L. Tingey

(57) ABSTRACT

A plurality of blocks are chained together in alignment over at least one rod, each with a recess for receiving a work piece between adjacent blocks. A second chain of holders may be employed to receive a different portion of the work pieces so the work pieces extend between the chains of blocks, forming a set of chains that may be presented as a unit before a cutting tool to make a cutting process efficient and uniform among work pieces. Further chains or sets of chains may be employed to hold a larger number of work pieces together. Chains of blocks are advantageously mounted on vise plates in plate holes spaced apart from centers of vertical and horizontal neighboring plate holes a same distance, d. Thus, two rods of a set of work piece holders may be positioned at preferred positions on the plate with recesses aligned vertically or horizontally.

15 Claims, 4 Drawing Sheets

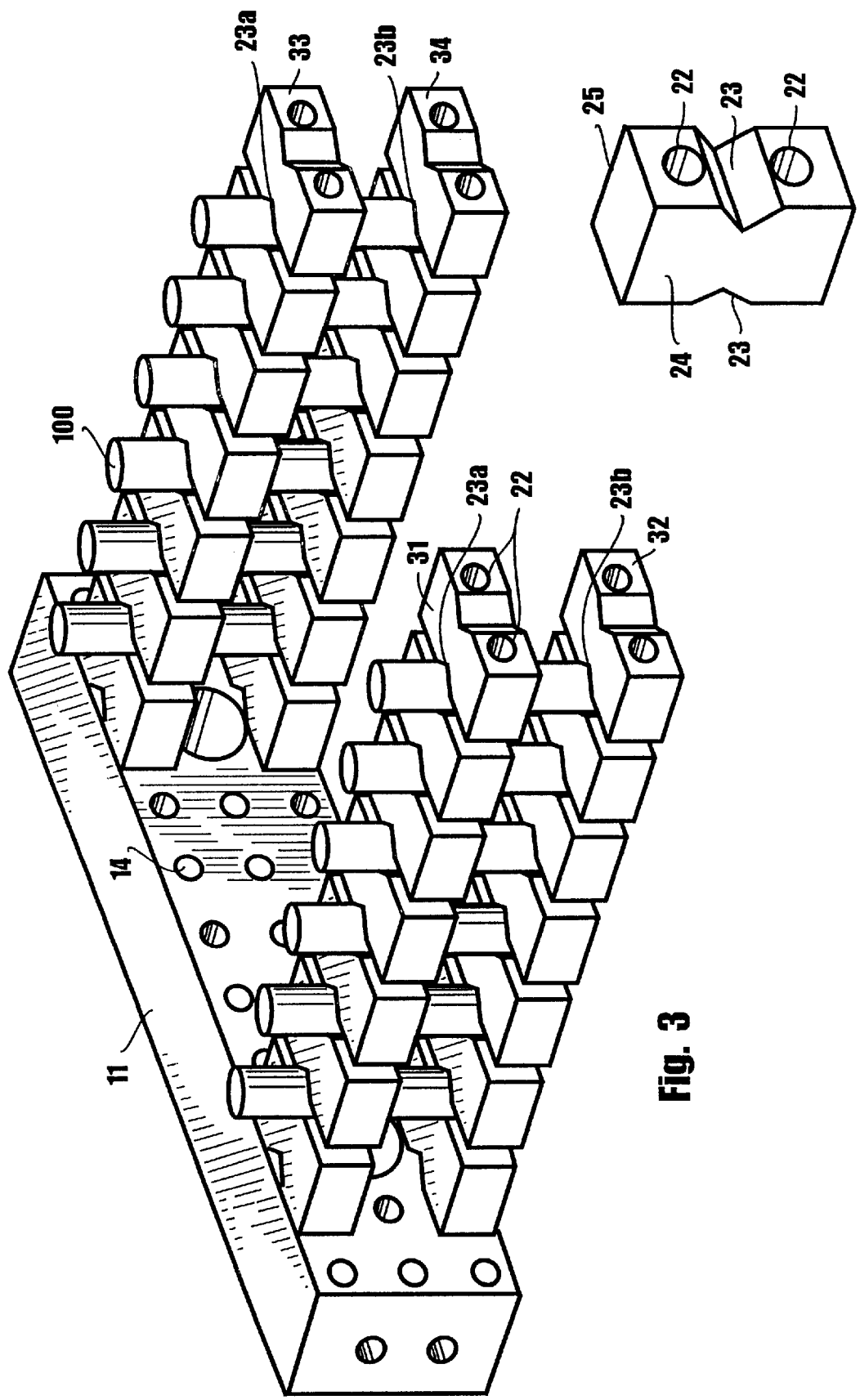

Squares

Hex

VISE PLATES WITH CHAIN BLOCKS

BACKGROUND

1. Field of the Invention

This invention relates to vises and accessories thereto and, specifically, to jaw plates and work piece holders used in combination with the plates.

2. Prior Art

It is known in the art to have general purpose vises with vise jaws appurtenant thereto with opposing flat surfaces for generally securing flat objects therebetween. Such vises are routinely used with mills, grinders, lathes, and machining centers.

Machining often requires accuracy to within 0.001" or less, requiring the vise to secure an object reliably to an accuracy of less than that tolerance. It is also common to require several like parts to be similarly machined. Typically, this is performed by machining a number of parts independently in succession. This is expensive, susceptible to introduction of machining errors and differences, and occupies a cutting machine and an operator for an extensive period of time

SUMMARY

It is an object of this invention to provide a work piece holder that secures a number of work pieces to a vise as a unit and presents that unit of work pieces to a cutting machine for treatment together, thus greatly reducing time to machine the work pieces and yielding a set of work pieces identically cut. It is a further object that the work pieces be spaced apart from other work pieces so that each may be separately addressed by a cutting tool, as may be found in a milling machine. It is further object that the work pieces be selectively mountable together in horizontal or vertical orientation thus presenting either work piece ends or sides to a cutting tool.

These objects are achieved in a pair of opposing jaw plates, the improvement in each comprising a precise uniform orthogonal pattern of holes in their front (opposing) sides. The holes are dual-purpose in receiving an unthreaded dowel or a threaded rod. The hole terminates in a threaded portion immediately preceded by an unthreaded portion and having a diameter less than that of the unthreaded portion diameter allowing bolt threads to pass through the unthreaded portion and engage the threads of the hole threaded portion. Thus, a rod or a bolt, such as a shoulder bolt, can be threaded into the hole threaded portion therein providing a positive attachment of the work piece holder to the plate. Typically, the unthreaded portion is sized to closely receive standard ¼-inch dowel pins to a hole depth of ⅝-inch.

A rod is secured on a vise plate hole over which slides a plurality of blocks. Each block has a recess for receiving a nominally cylindrical work piece larger than the recess so the work piece within the recess is clamped against a next adjacent holder when the two holders are urged together. A second rod spaced apart a same distance, d, is typically employed extending through second bores in the blocks with the recess between the bores. Thus, a number of work pieces can be secured in line with each work piece in a recess and between one of adjacent pairs of holders. The work piece holders thus grouped over a supporting rod in a plate hole form a first chain of holders.

A second chain of holders may be mounted spaced apart from the first chain with recesses of blocks in each chain aligned to hold a cylindrical work piece between them, the first and second chains forming a set. Further sets may be employed on the vice plates to hold a larger number of work pieces to make a cutting process efficient and resulting in uniformly cut work pieces.

So that work pieces may be positioned on the plate at any advantageous position, plate holes are spaced apart from centers of vertical and horizontal neighboring plate holes said same distance, d. Thus, two rods of a set of work piece holders may be positioned at preferred positions on the plate with recesses aligned vertically. Because the vise plate holes form an orthogonal array of holes in equally-spaced horizontal rows and vertical columns, the set can also be mounted on the plates horizontally with the aligned recesses oriented horizontally. Thus, cylindrical work pieces secured horizontally therein present sides upward to a cutting tool. Likewise because the vise plate holes form such a pattern of precisely-located holes, the sets of chained work piece holders can be mounted on the vise plates either oriented vertically or horizontally and spaced apart from other sets on the plates a preferred distance.

BRIEF DESCRIPTION OF THE DRAWINGS

FIG. 3 is a perspective view of the plates of FIG. 2 showing a larger plurality of work piece holders in each chain.

FIG. 4 is a perspective view of a work piece holder having two bores for receiving support rods and recess on each side for receiving a work piece.

DETAILED DESCRIPTION OF THE PREFERRED EMBODIMENT

Figure 1:
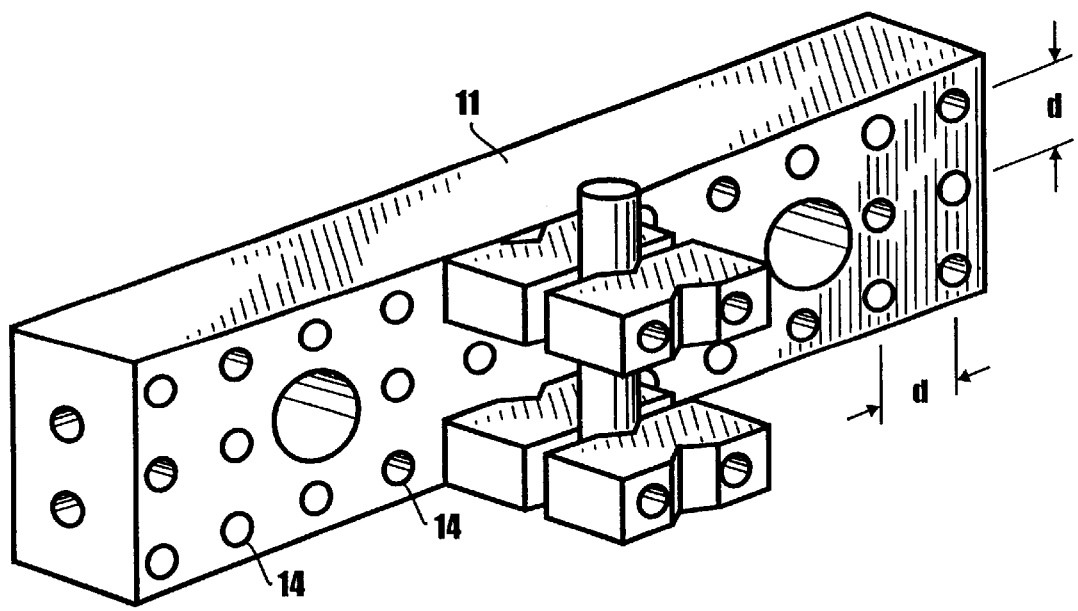
FIG. 1 is a perspective view of vise jaw plates with an orthogonal array of holes equally spaced, showing a set of two chains of work piece holders in vertical alignment, each chain comprising two works piece holders securing a cylindrical work piece vertically there them in a recess on a side of one work piece, urged against the other work piece.
Figure 2:
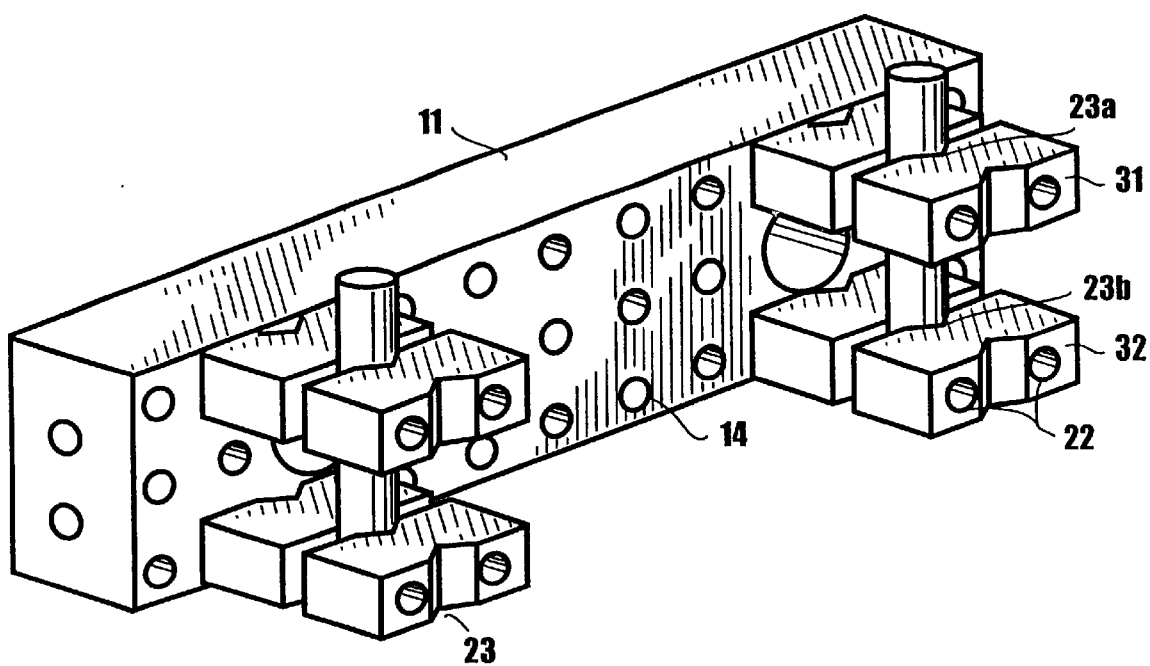
FIG. 2 is a perspective view of the plates of FIG. 1 showing further a second set of vertically-aligned chains of work piece holders.
Figure 5:
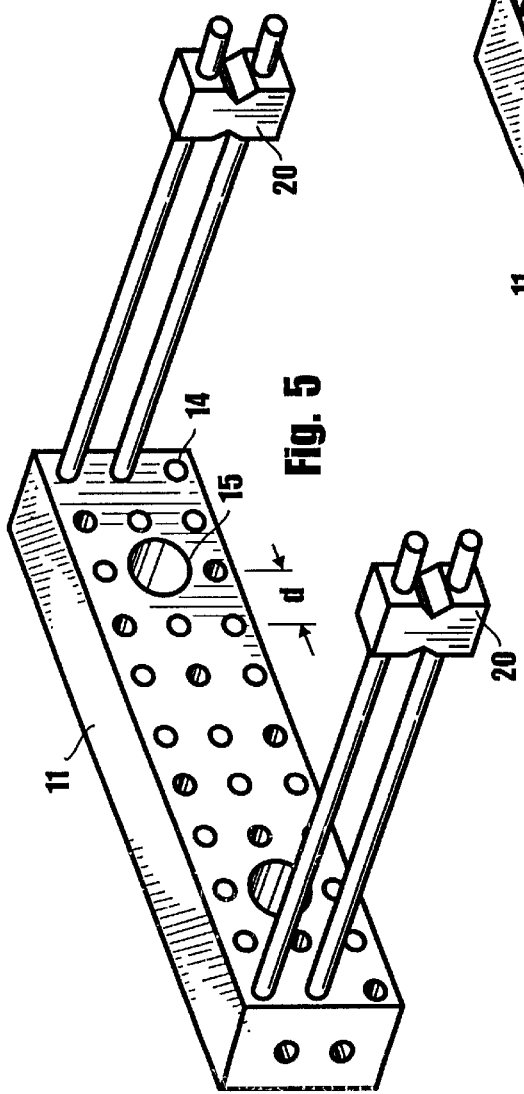
FIG. 5 is a perspective view of the plates of FIG. 1 and showing a first pair of first and second support rods in adjacent hole plates and passing through two bores in a work piece holder oriented horizontally. A second pair of support rods is also shown oriented horizontally and spaced apart from the first pair on the vise plates a preferred distance.
Figure 6:
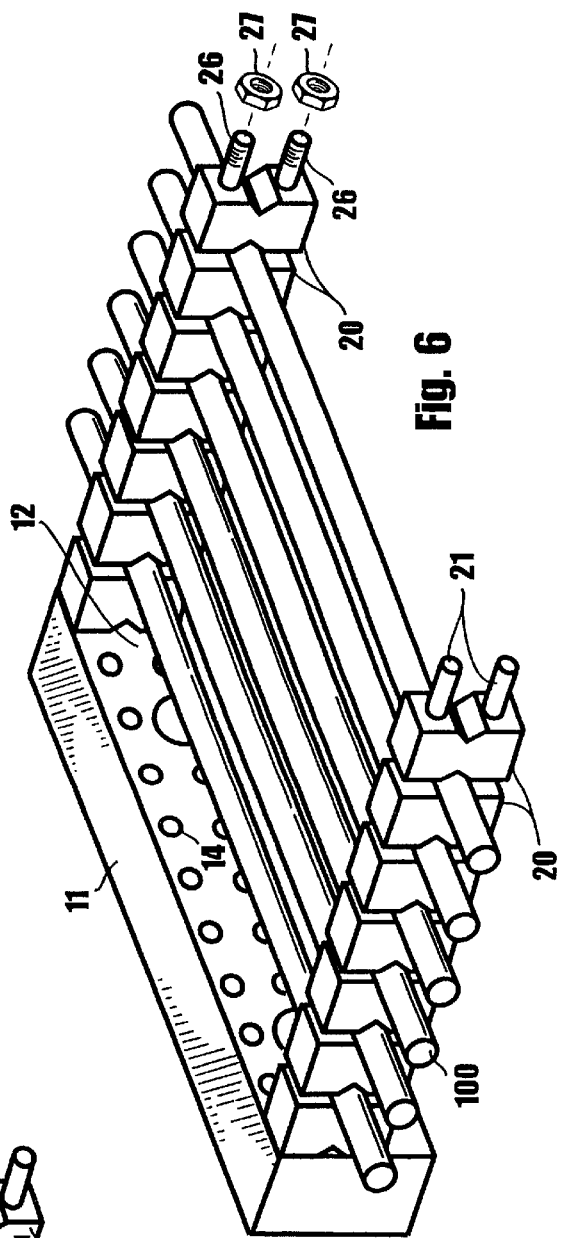
FIG. 6 is a perspective view of the plates of FIG. 5 showing a larger plurality of work piece holders in each chain.
Figures 7, 8A, 8B, 8C, 8D, 8E:
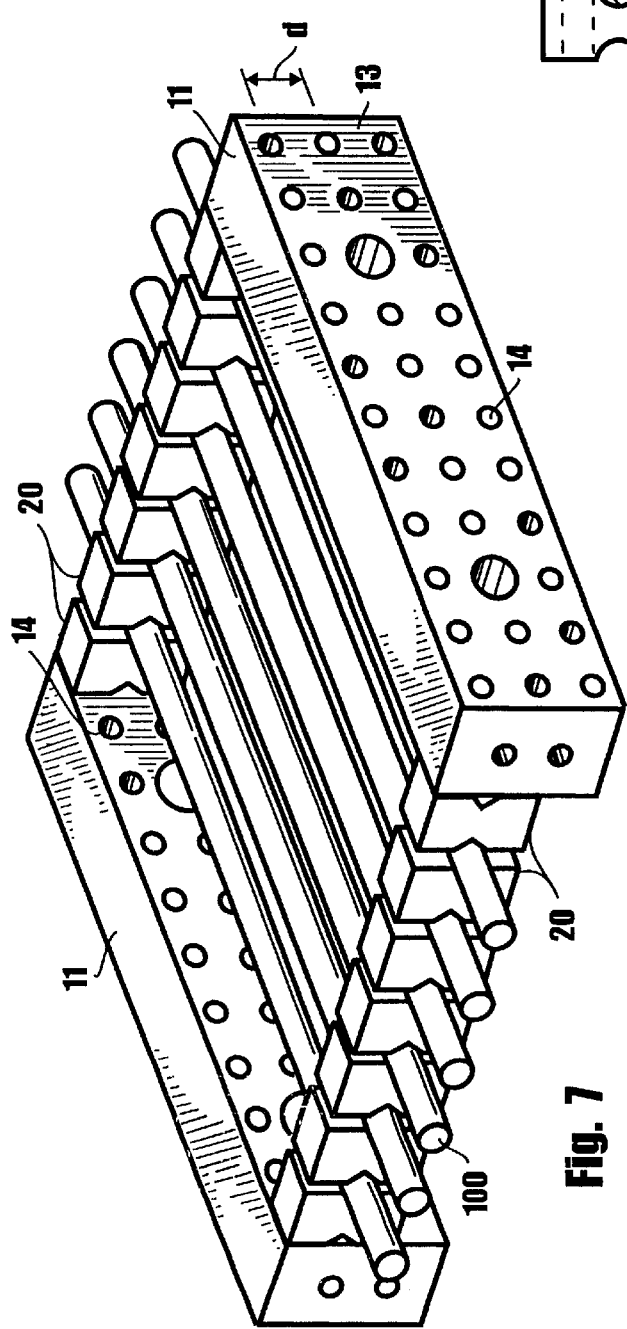
FIG. 7 is a perspective view of the plates of FIG. 6 showing a pair of vise plates with support rod ends extending into holes in the vise plates.
FIGS. 8a–d show side views of a pairs of work piece holders with a work piece of a variety of cross section shapes supported therebetween, respectively, the holders having recess surfaces adapted to receive and secure the various work piece shapes.

Referring to the drawings, the present invention comprises versatile first and second opposing vise jaw plates 11 each with parallel, flat front and back sides 12 and 13 for use with two or more work piece holders as may be required in securing a number of objects between vise plates simultaneously. At least one of said jaw plates has a uniform orthogonal pattern of same-sized plate holes 14 aligned in rows and columns with each hole center respectively spaced apart a same distance, d, from its nearest holes both in its respective row and column. Thus, a work piece holder with at least two posts matching the plate holes with post centers spaced apart a same distance, d, fits equally well in plate holes at any position throughout the hole pattern.

Each plate hole is adapted to receive either an unthreaded post and a threaded bolt with a threaded portion immediately beyond an unthreaded portion. The jaw plates may also have one or more vise mounting holes 15 for mounting the plates to typical vise jaws.

The work piece holder comprises a plurality of blocks 20 chained together in series. The blocks are supported between the plates on at least one and typically a pair of rods 21 passing through aligned bores 22 in the blocks and into plate holes 14. When employing two rods, the rods are spaced apart in the block holes a same distance, d, to match positions of the plate holes for positioning the work piece holder at any preferred position on the plates, either in vertically-adjacent or horizontally-adjacent plate holes. The rods may be threaded bolts matching the plate hole threaded portion or an unthreaded post matching the plate hole unthreaded portion.

Each block has a recess 23 between its bores in one or both of its front or back sides for receiving a work piece 100 partially therein. The recess generally comprises a channel orthogonal to the chain block bore running between the chain block top 24 and bottom 25. The recess cross-section may be of general shape, as triangular or semicircular, or it may be of particular shape, such as trapezoidal, ellipsoidal, or some other curvilinear shape.

Typically, a three or more blocks are secured to the vise plate in mutual alignment forming a first chain of blocks 31, disposed to receive a work piece in the recess between each set of adjacent blocks. Blocks oriented to have a recess opposing a recess of its adjacent block form clamping jaws between which a work piece, typically cylindrical, may be secured.

A second set of chain blocks 32 is typically mounted on the vise plates under the first set of chain blocks with respective recesses aligned vertically, the first and second pluralities of chain blocks therein cooperating to hold work pieces vertically secured in respective recesses 23a between sets of adjacent chain blocks in the first set of chain blocks and aligned recesses 23b between sets of adjacent chain blocks in the second set of chain blocks. The work pieces are advantageously secured in the blocks with a portion extending beyond the chain blocks to present the work piece portion upward, orderly exposing the work pieces for access to a machining cutting tool as might be employed in a milling machine. Thus, such orderly presentation of work pieces secured together as a unit before a machine tool enables cutting of the work pieces in a manner common to all of the work pieces through a common cutting action yielding identically cut work pieces.

A third and fourth set of aligned chain blocks 33 and 34 may also be mounted on the vise plate side by side the first and second set of aligned chain blocks to receive additional work pieces, further presenting upward additional work pieces in the commonly mounted unit for like access to and cutting by a machining cutting tool in a manner common to all work pieces secured to the vise plate and presented to such a cutting tool as a unit.

Sets of chain blocks may likewise be mounted in vertically-adjacent plate holes for receiving a work piece horizontally between the plates. Typically, a first set and a second set are spaced apart on the plates for receiving a number of elongated work pieces therebetween with a surface presented upward in anticipation of cutting by a machining tool.

At least one end portion 26 of the support rods may be threaded to receive a locking nut 27 that may be tightened against a last chain block, thus removably binding the chain blocks together with work pieces secured within. It is clear that sets of blocks thus bound together as a unit may be separated from the vise plates, inverted and reinstalled on the plates to present work piece undersides upward, retaining a positional relationship between the work pieces, alternately presenting upward first and second ends or surfaces of work pieces without releasing said work pieces from the chain block assembly.

One skilled in the art will recognize the advantages taught by this invention and illustrated by the preferred embodiment presented. The specification and drawings are not intended to represent an exhaustive description of the invention. Other obvious applications and extensions of the invention are intended to be within the spirit and scope of this invention.

Having described the invention, what is claimed is as follows:

1. A versatile vise jaw mountable to a vise, the improvement comprising
    a pair of opposing jaw plates, at least one of said jaw plates having a uniform orthogonal pattern of same-sized plate holes, the plate holes being aligned in rows and columns with each hole center respectively spaced apart a same distance, d, from its nearest holes both in its respective row and in its respective column such that a work piece holder with at least two rods each matching a plate hole and with rod centers spaced apart a same distance, d, fits equally well in plate holes at any position throughout the hole pattern, and,
    means for mounting said jaw plates to a vise,
    a first plurality of blocks forming a chain of blocks each block with front and back sides and top and bottom sides and each block with a recess in at least one of said block front and back sides for receiving a work piece therein and a first bore extending from the front side to the back side, said first bore of each block in alignment for receiving a first support rod therethrough,
    a first support rod extending through the respective block first bores and into one of said vise plate holes therein securing the first plurality of chain blocks to the vise plate.

2. The invention of claim 1 further comprising
    second bores extending from the front side to the back side of the blocks, respectively, said second bores of said blocks in alignment for receiving a second support rod therethrough, said second bores spaced apart from said first bores said distance, D,
    a second support rod extending through the respective block second bores and into one of said vise plate holes therein securing the first plurality of chain blocks to the vise plate.

3. The invention of claim 2 in which said first support rod and said second support rod pass through said first bores and second bores of said chain blocks, respectively, selectively fitting into vertically-adjacent vise plate holes or horizontally-adjacent vise plate holes.

4. The invention of claim 1 further comprising at least three of said plurality of chain blocks secured in chained alignment to the vise plate, disposed to receive a work piece between each set of adjacent chain blocks.

5. The invention of claim 1 in which said chain blocks have a recess in both the block front and back sides, mutually opposed.

6. The invention of claim 1 further comprising a second plurality of chain blocks forming a second chain of blocks each block with front and back sides and top and bottom sides and each block with a recess in least one of the block front and back sides for receiving a work piece in the recess, the second chain of blocks removably located under the first chain of blocks with corresponding recesses between the two chains aligned vertically, the first and second chains of blocks cooperating to vertically hold work pieces secured in respective corresponding recesses between chains of blocks, the work pieces extending beyond the first plurality of chain blocks and presenting a work piece portion upward, orderly exposing the work pieces providing access to a machining cutting tool with such orderly presentation of such plurality of said work pieces enabling cutting of the work pieces in a manner common to said plurality of work pieces secured together as a unit before a machine tool.

7. The invention of claim 6 further comprising third and fourth chains of blocks similar to the first and second chains and mountable on the vise plate side by side the first and second chains of blocks similarly disposed for removably securing therein a second plurality of work pieces, thereby presenting upward additional work pieces for like access to and cutting by a machining cutting tool in a manner common to all said work pieces, therein securing said blocks together to the vise plate as a unit.

8. The invention of claim 1 wherein said rod comprises a threaded portion extending beyond said blocks and further comprising a securing nut on said threaded portion disposed to releasably tighten said blocks on said rod to said plate to which the rod is secured.

9. The invention of claim 1 further comprising a second vise plate with an array of holes in like manner to the said vise plate and receiving a rod end into a hole is the second vise plate such that the rod extends between both plates.

10. The invention of claim 1 further comprising a second plurality of chain blocks forming a second chain of blocks each block with front and back sides and top and bottom sides and each block with a recess in least one of the block front and back sides for receiving a work piece in the recess, the second chain of blocks removably horizontally spaced apart from the first chain of blocks with corresponding recesses between the two chains aligned horizontally, the first and second chains of blocks cooperating to horizontally hold work pieces secured in respective corresponding recesses between chains of blocks, the work pieces extending beyond the first plurality of chain blocks and presenting a work piece side portion upward, orderly exposing the work pieces providing access to a machining cutting tool with such orderly presentation of such plurality of said work pieces enabling cutting of the work pieces in a manner common to said plurality of work pieces secured together as a unit before a machine tool.

11. An assembly of blocks for holding together a plurality of work pieces for common presentation before a machine tool, comprising a first plurality of blocks forming a first chain of blocks, each block with front and back sides with the front of one block opposing the back of an adjacent block with a recess in at least one of said opposing block front and back sides for receiving a work piece in the recess between said front and back sides in a clamping action and a first bore extending from the front side to the back side, said first bore of each block in alignment for receiving a rod therethrough, a first support rod, with ends, extending through the respective block first bores, means to releasably tighten the blocks together on the first support rod in alignment as a unit such that when a plurality of work pieces are held in the unit, the work pieces respectively received and clamped between adjacent blocks, the work pieces presenting a surface in a common direction orthogonal to and extending beyond the first support rod.

12. The assembly of blocks of claim 11 wherein both ends of the first support rod extend beyond the first plurality of blocks, receivable into mounting holes of a vise plate.

13. An assembly of blocks for holding together a plurality of work pieces for common presentation before a machine tool, comprising a first plurality of blocks forming a first chain of blocks, each block with front and back sides with the front of one block opposing the back of an adjacent block with a recess in at least one of said opposing block front and back sides for receiving a work piece therein and a first bore extending from the front side to the back side, said first bore of each block in alignment for receiving a rod therethrough, a first support rod, with ends, extending through the respective block first bores, means to releasably tighten the blocks together on the first support rod in alignment as a unit such that when a plurality of work pieces are held in the unit, the work pieces respectively received and clamped between adjacent blocks, the work pieces present a surface in a common direction orthogonal to and extending beyond the first support rod, a second chain of blocks and second support rod in like configuration as the first chain of blocks and first support rod adapted to receive first ends of said plurality of work pieces in said first chain of blocks and second ends of said plurality of work pieces in said second chain of blocks.

14. The method of holding a plurality of work pieces for common presentation as a unit before a machine tool, comprising the following steps:

(a) assembling a first plurality of blocks aligned in a first chain, each block with front and back sides and top and bottom sides and with a recess in at least one of said block front and back sides for receiving a work piece therein and a first bore extending from the front side to the back side, said first bore of each block in alignment for receiving a rod therethrough;

(b) inserting a first support rod through the respective block first bores;

(c) placing a first portion of a plurality of work pieces in respective recesses between adjacent blocks;

(d) fastening a securing means over rod ends, therein tightening the blocks together on the first support rod in alignment securing said plurality of work pieces as a unit, the work pieces respectively received and clamped between adjacent blocks, the work pieces in alignment thereby presenting a surface in a common direction orthogonal to and extending beyond the first support rod, (e) assembling a second plurality of blocks and second support rod aligned in a second chain of blocks in like configuration as the first chain of blocks and first support rod, each block similarly with front and back sides and top and bottom sides likewise with a recess in at least one of said block front and back sides for receiving a work piece therein and a first bore extending from the front side to the back side, said first bore of each block in alignment for receiving a rod therethrough;

(f) inserting an other support rod through the respective block first bores;

(g) placing a second portion of said plurality of work pieces in respective recesses between adjacent blocks such that said work pieces extend between the two chains;

(h) fastening a securing means over ends of said other rod, therein tightening blocks of the second chain together on the other support rod in alignment securing said plurality of work pieces as a unit, the work pieces respectively received and clamped between adjacent blocks, the work pieces in alignment thereby presenting a surface in a common direction orthogonal to and extending beyond the first support rod.

15. The method of claim 14 further comprising the step of (a) securing first rod ends into holes of a first vise plate;

(b) securing second rod ends into holes of a second vise plate, therein forming a unit of a plurality of work pieces with like orientation secured between two vise plates.

* * * * *